May 31, 1960

C. E. KEENAN 2,939,061

INDICATOR SERVOSYSTEM

Filed Nov. 29, 1957

INVENTOR
Charles E. Keenan
BY
Pollard, Johnston, Smyth & Robertson
ATTORNEYS

May 31, 1960

C. E. KEENAN 2,939,061

INDICATOR SERVOSYSTEM

Filed Nov. 29, 1957

INVENTOR
Charles E. Keenan
BY
Pollard Johnston Smythe & Robertson
ATTORNEYS

May 31, 1960 C. E. KEENAN 2,939,061
INDICATOR SERVOSYSTEM
Filed Nov. 29, 1957 4 Sheets-Sheet 3

INVENTOR
Charles E. Keenan
BY
Pollard Johnston Sug The 3 Robertson
ATTORNEYS

United States Patent Office 2,939,061
Patented May 31, 1960

2,939,061

INDICATOR SERVOSYSTEM

Charles E. Keenan, Perkasie, Pa., assignor to American Machine and Metals, Inc., Sellersville, Pa., a corporation of Delaware Filed Nov. 29, 1957, Ser. No. 699,674

12 Claims. (Cl. 318—30)

This invention relates to indicators and particularly to a remote servo driven indicating arrangement.

In the transmission of information, it frequently is necessary to use a dual speed synchro system so as to indicate accurately the data to be displayed. It also is necessary to provide dual speed systems wherein the gear ratio between coarse and fine speeds is even and yet which will null at the proper zero point. It is known to use electronic tubes in such systems but the circuits are complex and require a plurality of tubes and components. A further requirement for many instruments is that they must be compact and light in weight.

One of the objects of the invention is to provide an indicating means which is simple, compact, and has low power consumption.

Another object of the invention is to provide a digital read-out or indicator which will show negative or positive values from a predetermined reference point, such as zero.

Another object of the invention is to provide a dual speed sychro system which is compact, will properly null each time, and will not be damaged because of temperature.

In one aspect of the invention, a two speed transmitter or synchro generator can be used having rotors mechanically connected through a gear arrangement to provide coarse and fine signals. Preferably, the indicating means, servo amplifier and motor means are arranged in a relatively small assembly. The receivers may include a two speed control transformer having rotors mechanically connected through a gear train similar to the transmitter and a servo motor for driving the control transformer rotors to a null position, the servo motor being energized by a transistorized amplifier having voltage sensitive or non-linear switching means. Also can be included means protecting the transistor at high temperature and means providing an auxiliary or "stick-off" voltage to the coarse control transformer to provide for true null position for even gear ratios. As a further feature, the servo motor can have a generator section which is connectable to the transformer means of the receiver to inhibit hunting. The servo motor can be connected so as to drive suitable digital read-out means or indicators.

These and other objects, advantages and features of the invention will become apparent from the following description and drawings which are merely exemplary.

The invention will be described in conjunction with a synchro servo driven remote indicator sensing the position of two transmitter synchro mechanisms which are geared to each other, the transmitter synchros providing a coarse and a fine signal which is fed to a coarse and fine synchro control transformer arrangement, the latter being geared together and driven by a servo motor generator. The indication presented may be digital and in the form shown can be used to provide plus and minus digital readings on a pair of digital indicator assemblies. An integral transistorized amplifier is connected so as to furnish the power to drive the control transformer means through the servo motor to a proper null position and thus position the digital indicator means.

Figure 1:
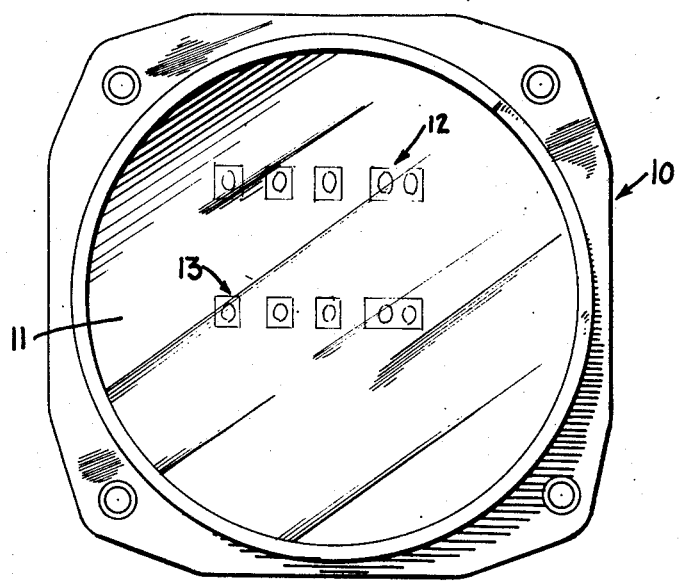
Fig. 1 is a front view of the face of one type of instrument using the invention.
Figure 2:
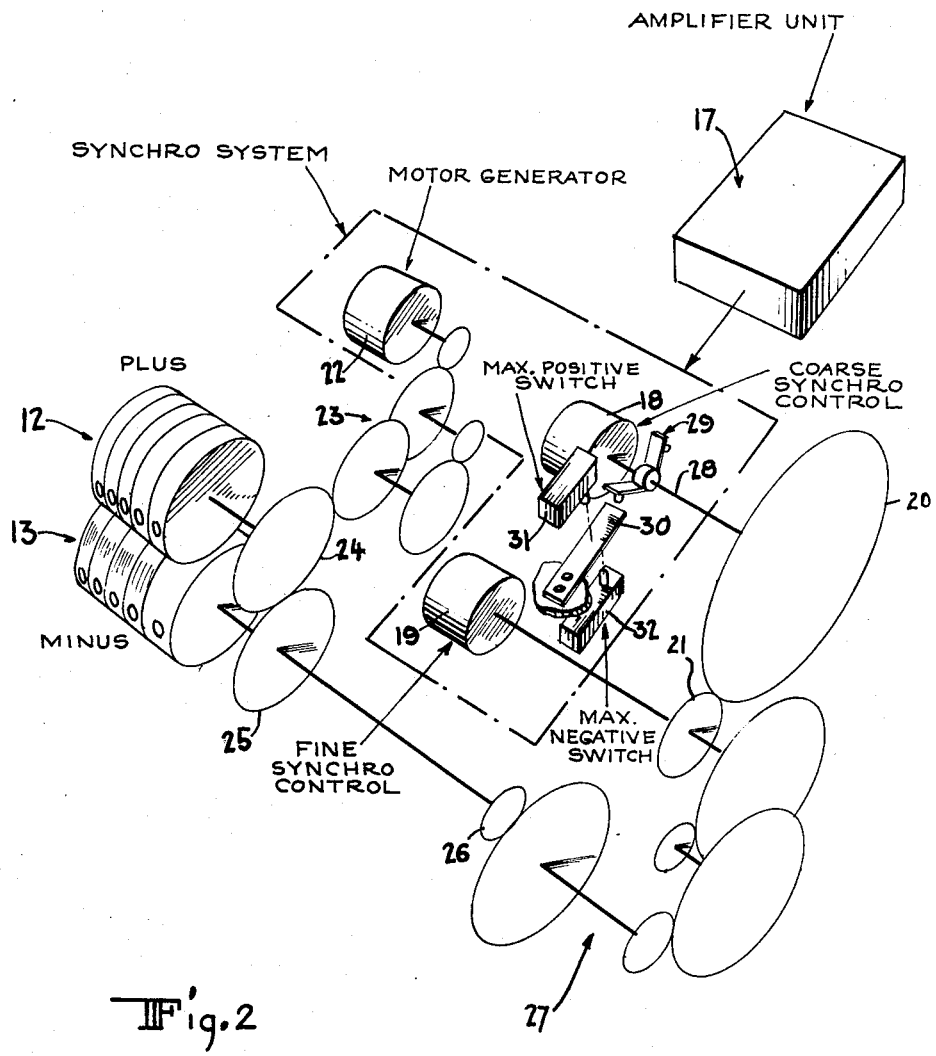
Fig. 2 is a schematic view of one arrangement of the instrument.
Figure 3:
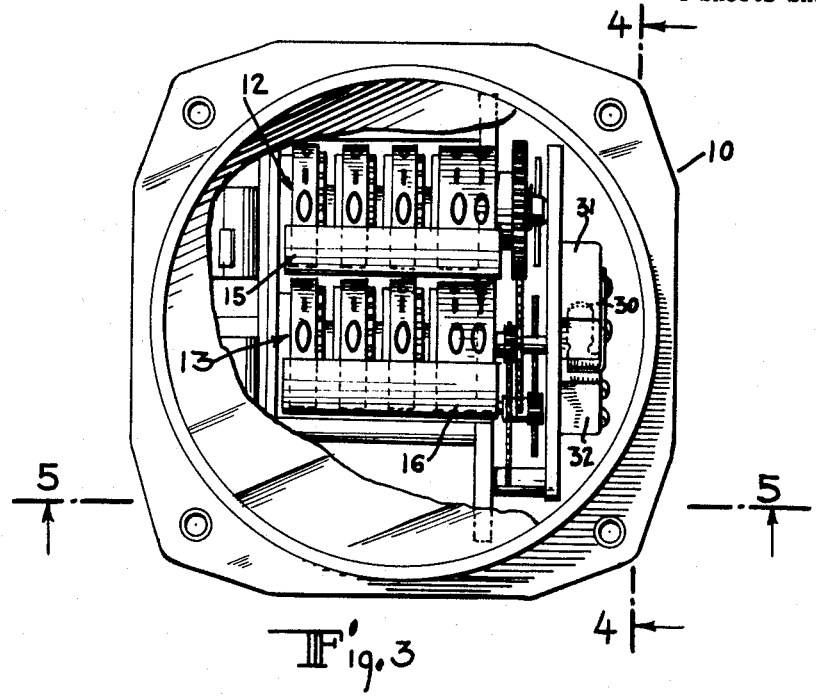
Fig. 3 is an enlarged front view of the instrument of Fig. 1, a portion of the case being broken away.
Figure 4:
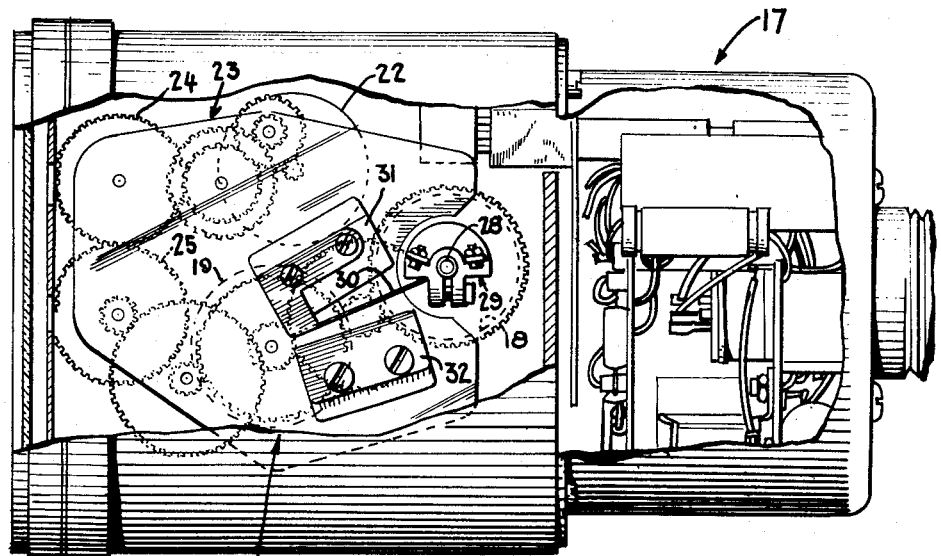
Fig. 4 is a side view looking in the direction of line 4—4 of Fig. 3, a portion of the case being broken away.

Referring first to Fig. 1, case 10 may have face 11 with a pair of digital indicator or read-out means thereon, each having conventional indicia wheel assemblies. In the form shown, read-out or indicator for the positive direction is at 12 and for the negative direction is at 13. The indicator means or counter mechanism can be of any suitable type, for example, similar to that shown in U.S. Patent No. 1,342,476. The indicator means can be driven by gearing 23 from the servo motor as will be described later. Shields 15, 16 (Fig. 3) may be arranged so that they will be operated by suitable pins or lugs (not shown) to cover the indicator which has reached its minimum, information then being readable from the other indicator.

It is also possible to omit one of the digital indicators or read-outs and employ the arrangement for displaying one piece of digital information such as time, temperature and the like.

Figure 5:
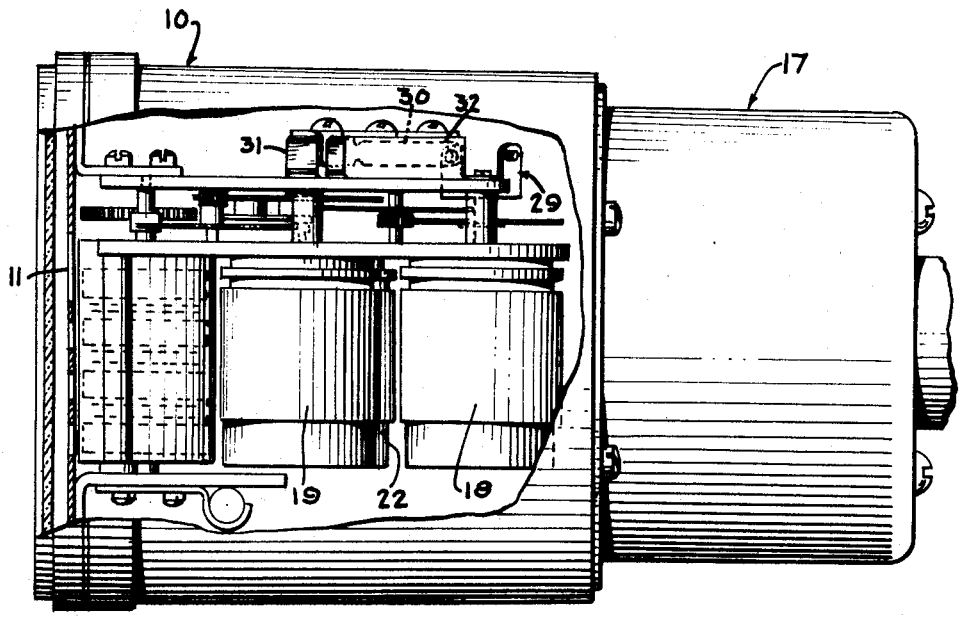
Fig. 5 is a bottom view looking in the direction of the line 5—5 of Fig. 3, a portion of the case being broken away.

The amplifier assembly is indicated generally by reference numeral 17. Coarse control transformer 18 (Figs. 1, 5) and fine control transformer 19 are connected together by gear means 20, 21, the ratio thereof being, for example, 10 to 1. Servo motor generator 22 is connected in a conventional manner through gear train 23 to dial or read-out means driving gears 24, 25. Gear means 26, driven by the servo motor generator 22, is connected through gear train means 27 to the fine control transformer and the associated coarse control transformer. Obviously, specific details and arrangement of the gear trains involved can be varied as needed.

Shaft 28 may have a limit switch arrangement 29 thereon for actuating the operator 30 for the maximum positive switch 31 and maximum negative switch 32 as will be described later.

Figure 6:
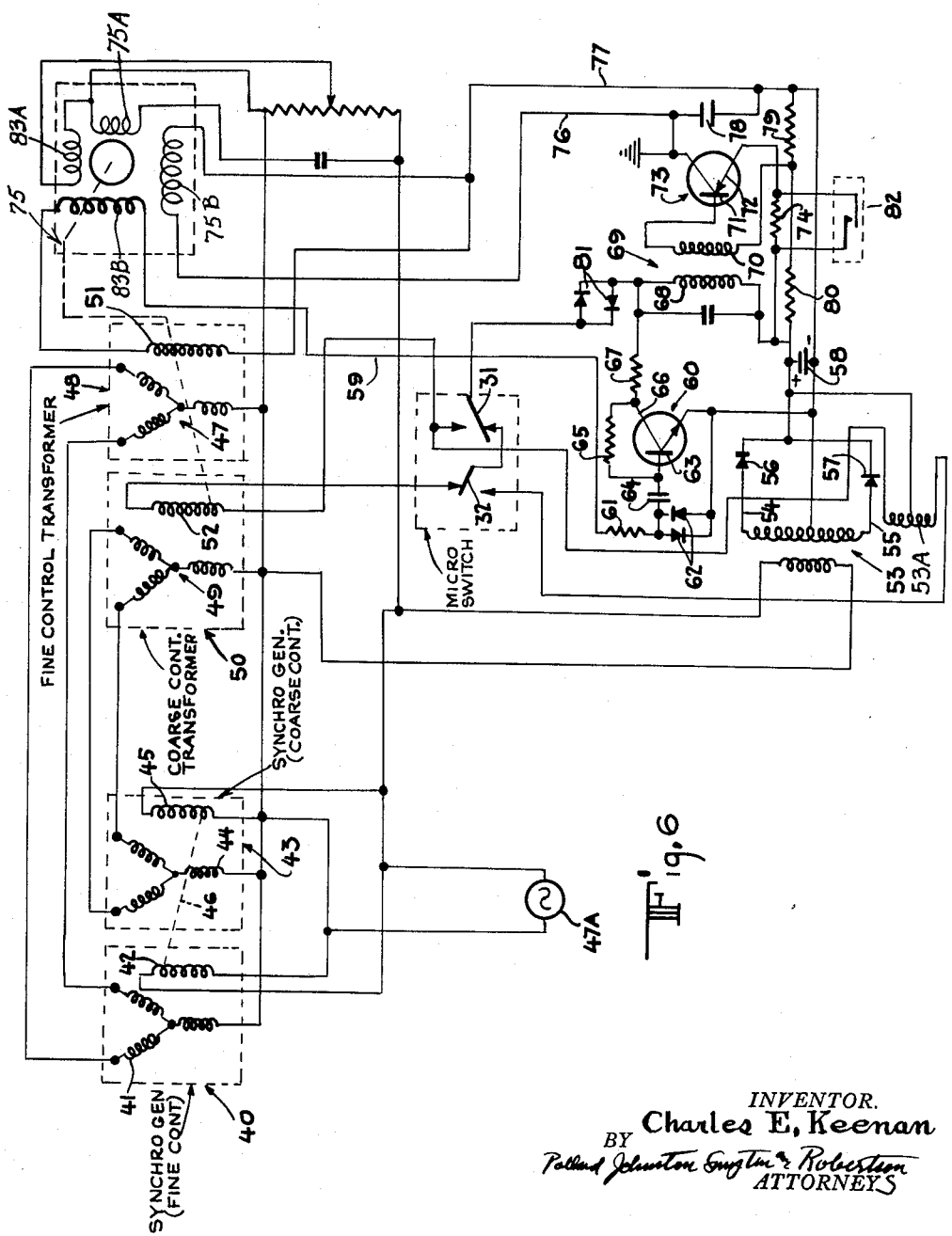
Fig. 6 is a circuit diagram of one form which can be used.

Referring to Fig. 6 as an example of one embodiment of the invention, fine control generator or transmitter 40 may have conventional Y connected stator windings 41 and coarse generator or transmitter 43 may have the usual Y connected stator windings 44 and rotor winding 45. Rotor windings 42 and 45 are connected mechanically through suitable gearing means schematically indicated at 46, the fine or high speed rotor turning ten revolutions to one of the coarse. A source of A.C. 47A is connected to rotors 42 and 45. The transmitter fine control windings 41 are connected to fine control transformer windings 47 of the fine control transformer 48. The transmitter coarse control windings 44 are connected to the coarse control transformer windings 49 of the coarse control transformer 50. The transmitter normally can be located at a distance from the control transformers and connected thereto by the usual wires.

Fine control transformer rotor 51 is mechanically connected to the coarse control transformer rotor 52 through a gear train having the same ratio as that of the transmitter.

Power transformer 53 of the servo amplifier may be a center tap isolation type transformer wherein the secondary ends 54, 55 are connected to diodes 56, 57, which may be silicon, the diodes being employed as a full wave rectifier connected to filter condenser 58 with the illustrated polarity.

The signals from the control transformers are connected to the amplifier to operate the servo motor 75 for nulling the indicator as will now be explained. Fine control transformer 48 has its signal fed through lead 59 to the first or driver stage transistor 60 which in the form illustrated is a NPN type transistor, the signal being fed thereto through a limiting resistor 61. A pair of diodes 62, which may be silicon, immediately follow resistor 61, said diodes being connected with their polarities in opposite direction.

By way of example, when the output of the full wave rectifier arrangement is approximately 30 volts D.C. at 80 ma. with maximum signal, the normal variation of the fine control voltage may be arranged to be from 0 to 20 volts.

The combination of the limiting resistor 61 and diodes 62 reduce the input voltage so that it does not exceed a predetermined desired maximum signal, for example, 2 volts. After passing through the limiting resistor 61, the signal is fed to the base 63 of transistor 60 through a suitable isolation condenser 64. The base is biased in the forward direction by resistor 65 connected to collector 66. This also will provide self bias because high currents in collector 66 will result in a less positive potential being applied to base 63.

The signal upon leaving the collector 66 of the driver transistor 60 is fed through coarse signal blocking or voltage dropping resistor 67, the amplified signal being applied across primary 68 of driver transformer 69. Secondary 70 of driver transformer 69 injects the amplified signal across the base 71 and emitter 72 of power transistor 73. Power transistor 73 may be of the PNP type connected to the positive side of the power supply through transistor current limiting resistor 74, the purpose of resistor 74 being to prevent runaway conditions at elevated temperatures as will be explained later. Servo motor generator 75 is connected in the collector circuit of the power transistor as a load through leads 76 and 77. Condenser 78 may be connected across said load so as to improve the power factor by means of a phase shift.

Secondary 70 of driver transformer 69 is also connected across the voltage divider network including resistors 79, 80, in order to establish the correct bias on base 71 of power transistor 73. Such a network will result in reduced power being drawn when the arrangement is in a null condition.

In order to inject the coarse signal into the circuit and cause operation thereby, coarse control transformer winding 52 is connected through the non-linear diodes 81 to primary 68 of driver transformer 69, said diodes being connected in parallel with opposing polarities. These diodes may be of silicon or any suitable material chosen so that at signals below a predetermined level, for example, one volt, they will exhibit considerable resistance and so that above one volt their resistance will drop rapidly. Thus, the diodes provide a voltage sensitive switching arrangement which will inject the coarse signal when its magnitude is above a predetermined potential, for example, one volt. Resistor 67 is provided to prevent the coarse signal feeding back through driver transistor 60 when large signals occur and, therefore, effectively constitutes blocking means.

It is necessary to have the amplifier arrangement distinguish between the two coarse null points which are present under even gear ratios. In order to accomplish this, an auxiliary voltage is provided by secondary 53A in series with the rotor of the coarse control transformer, such voltage being termed a "stick-off" voltage. As a result, at the true null of the coarse control transformer, a signal will be injected in the amplifier which will be equal to the stick-off voltage. At some rotor position of the coarse control transformer, the transformer will have a voltage of its own equal to, but in opposite polarity to the stick-off voltage, so that this point will become the null point of the coarse control transformer. At this point, the fine control transformer must also be at its null position. At a position of the coarse control transformer 180° from the null point so established, the voltage that it generates will again be equal to the stick-off voltage, but it will now be of the same polarity, and thus will add to the stick-off voltage. Therefore, even though the fine control transformer is at null, the coarse control transformer will be injecting twice the stick-off voltage into the amplifier and the servo motor will continue to drive away from this point. At some point other than the true coarse null, the voltage from the coarse control transformer will again be zero, but at this latter point, the fine control transformer will not be at null. If the magnitude of the stick-off voltage is properly selected, such will occur when the fine control transformer is driving in the same direction, and, therefore, the servo motor will continue to drive to the one point where both fine and coarse arrive at null. For the 10 to 1 ratio between the fine and coarse control transformers, it has been found that a stick-off voltage of 2.2 volts will give good results.

Switches 31 and 32 will be actuated at the maximum positive position and maximum negative position to stop the indicator means. For example, Fig. 6 shows that the switches 31 and 32 are in their normal position. When either switch is moved to the opposite contact at the maximum or minimum position, a voltage of opposite phasing is connected to the servo motor so as to back the indicator away from its maximum or minimum position. The switch recloses and the device will move between these two points until the transmitter is returned to a usable portion of the range.

The stick-off voltage may be derived from the upper winding of secondary 53A. The stick-off voltage is combined with the voltage across coarse control transformer winding 52 and applied through diodes 81 to servo motor 75. With one of the two possible phase conditions at winding 52, servo motor 75 will be driven in a particular direction. If the motor is driven sufficiently in that direction, one of the limit switches, for example, switch 32 will be actuated. The actuation of switch 32 cuts out winding 52 and connects the lower winding of stick-off windings 53A to servo motor 75.

Since secondary 53A is center-tapped, the switching to the lower winding will connect the opposite phase to motor 75 and result in its reversal. In effect, if the composite signal of winding 52 and the upper winding of secondary 53A cause motor 75 to run in a direction to actuate limit switch 32, the connection of the lower winding of windings 53A to motor 75 will reverse it and move it from the limit condition.

On the other hand, if the opposite phase is present at winding 52 (opposite to the case discussed above), motor 75 will run in the opposite direction. If motor 75 runs to the other limit condition in the opposite direction, switch 31 will be actuated. Switch 31 will cut-out winding 52 and leave only the upper winding of secondary 53A in circuit with motor 75. The stick-off voltage of the upper winding is opposite to the previously mentioned composite signal from winding 52 and the upper winding. Therefore, the opposite phase is furnished to motor 75 and it will reverse itself and drive away from the limit condition.

It has been found that at high temperatures some of the power transistors draw excessive currents which may result in damage to the transistor. As previously mentioned, resistor 74 is provided in series with collector 72 of power transistor 73. Such will limit the collector current, for example, to 85 milliamperes at 168° F., but this also results in a loss of, for example, two (2) volts in the amplifier output. This loss may be serious at low temperatures when small output signals associated with null are involved. The loss is due to the signal injected being in series with resistor 80 of the voltage divider and resistor 74. A thermostat 82 can be used to short out resistor 74 at temperatures less than a predetermined amount such as 32°.

Sometimes hunting problems exist in servo driven digital indicators. Such can be substantially eliminated or inhibited by using a servo motor with an induction generator shown in box 75 incorporated therein. Winding 75A is the fixed phase winding of the servo motor and winding 75B is the control winding of the servo motor. The induction generator section has an input section 83A and output section 83B. If, for example, the servo motor generator is rotating at 1,000 r.p.m. and 20 millivolts signal is connected in series, producing subtracting instantaneous polarities in relation to the off null control transformer voltage, and the transformer voltage is suddenly removed, the device would stop and try to turn in the opposite direction. If this would occur, the phase of the generated voltage would reverse when the motor generator reversed and stop the assembly. Thus, the generator voltage always tends to rotate the motor generator in an opposite direction to the rotation in which that voltage was generated making it practically impossible for the servo motor to hunt. The values can be chosen so as not to affect operation. It should be apparent that various details can be varied and that the arrangement can be used for various purposes without departing from the spirit of the invention except as defined in the appended claims.

What is claimed is:

1. In a multiple speed remote indicating device adapted to be connected to a multiple speed transmitter means, the combination including a coarse control transformer means and a fine control transformer means having their movable elements mechanically connected together, said control transformer means being electrically connectable to said transmitter means, servo motor means mechanically connected to said control transformer means, and circuit means including a driver transistor, a power transistor, said driver transistor being connected to the fine signal control transformer means, means for connecting the coarse signal control transformer means to the output of said driver transistor and input of said power transistor, and a voltage sensitive switching means between said coarse signal control transformer means and the connection to said power transistor operable so that when the coarse signal voltage reaches a predetermined value, said coarse signal will override the fine signal to drive the servo motor.

2. In a multiple speed remote indicating device adapted to be connected to a multiple speed transmitter means, the combination including a coarse control transformer means and a fine control transformer means having their movable elements mechanically connected together, said control transformer means being electrically connectable to said transmitter means, servo motor generator means mechanically connected to said control transformer means, and circuit means including a driver transistor, a power transistor, said driver transistor being connected to the fine signal control transformer means, means for connecting the coarse signal control transformer means to the output of said driver transistor and input of said power transistor, a voltage sensitive switching means between said coarse signal control transformer means and the connection to said power transistor operable so that when the coarse signal voltage reaches a predetermined value, said coarse signal will override the fine signal to drive the servo motor, and means connecting the generator section of said servo motor generator means to said control transformer means so as to inhibit hunting.

3. In a multiple speed remote indicating device adapted to be connected to a multiple speed transmitter means, the combination including a coarse control transformer means and a fine control transformer means having their movable elements mechanically connected together, said control transformer means being electrically connectable to said transmitter means, servo motor means mechanically connected to said control transformer means, and circuit means including a driver transistor, a power transistor connected to said driver transistor through a transformer, said driver transistor being connected to the fine signal control transformer means, means for connecting the coarse signal control transformer means to the output of said driver transistor and input of said power transistor, and a voltage sensitive switching means between said coarse signal control transformer means and the connection to said power transistor operable so that when the coarse signal voltage reaches a predetermined value, said coarse signal will override the fine signal to drive the servo motor.

4. In a multiple speed remote indicating device adapted to be connected to a multiple speed transmitter means, the combination including a coarse control transformer means and a fine control transformer means having their movable elements mechanically connected together, said control transformer means being electrically connectable to said transmitter means servo motor generator means mechanically connected to said control transformer means, and circuit means including a driver transistor, a power transistor connected to said driver transistor through a transformer, said driver transistor being connected to the fine signal control transformer means, means for connecting the coarse signal control transformer means to the output of said driver transistor and input of said power transistor, and a voltage sensitive switching means between said coarse signal control transformer means and the connection to said power transistor operable so that when the coarse signal voltage reaches a predetermined value, said coarse signal will override the fine signal to drive the servo motor, and means connecting the generator section of said servo motor generator means to said control transformer means so as to inhibit hunting.

5. In an indicating device of the multiple speed type adapted to be connected to a two speed transmitter means, the combination including coarse control transformer means and fine control transformer means having their movable elements mechanically connected together, said control transformer means being connectable to said transmitter means, servo motor means mechanically connected to said control transformer means for driving the same, and circuit means for said servo motor means including a driver transistor, a power transistor means for connecting said driver transistor to said fine signal control transformer means, means for connecting said coarse signal transformer means to a point between the output of said driver transistor and input of said power transistor, and non-linear diode means in the connection between said coarse signal control transformer means and the connection to said power transistor operable so that when the coarse signal voltage reaches a predetermined value, said coarse signal will drive the servo motor.

6. In an indicating device of the multiple speed type adapted to be connected to a two speed transmitter means, the combination including coarse control transformer means and fine control transformer means having their movable elements mechanically connected together, said control transformer means being connectable to said transmitter means, servo motor means mechanically connected to said control transformer means for driving the same, and circuit means for said servo motor means including a driver transistor, a power transistor means for connecting driver transistor to said fine signal control transformer means, means for connecting said coarse signal transformer means to a point between the output of said driver transistor and input of said power transistor, and a pair of non-linear diode means connected in parallel and in reverse polarity relative to each other in the connection between said coarse signal control transformer means and the connection to said power transistor operable so that when the coarse signal voltage reaches a predetermined value, said coarse signal will drive the servo motor.

7. In an indicating device of the multiple speed type adapted to be connected to a two speed transmitter means, the combination including coarse control transformer means and fine control transformer means having their movable elements mechanically connected together, said control transformer means being connectable to said transmitter means, servo motor means mechanically connected to said control transformer means for driving the same, and circuit means for said servo motor means including a driver transistor, a power transistor means for connecting said driver transistor to said fine signal control transformer means, means for connecting said coarse signal transformer means to a point between the output of said driver transistor and input of said power transistor and a pair of non-linear diode means connected in parallel and in reverse polarity relative to each other in the connection between said coarse signal control transformer means and the connection to said power transistor, operable so that when the coarse signal voltage reaches a predetermined value, said coarse signal will drive the servo motor and means for blocking said coarse signal in the connection between said point and said driver transistor.

8. In a two speed remote indicating device adapted to be connected to a two speed transmitter means, the combination including a coarse control transformer and a fine control transformer, means mechanically connecting the movable elements of said transformers, said control transformers being electrically connectable to said transmitter means, servo motor means mechanically connected to said control transformers and circuit means including a driver transistor, a power transistor, means connecting said driver transistor to said fine signal control transformer, means for connecting said coarse signal transformer to a connecting means between the output of said driver transistor and input of said power transistor, a non-linear voltage sensitive means between said coarse signal control transformer and the connection to said power transistor operable so that when the coarse signal voltage reaches a predetermined value, said coarse signal will drive the servo motor.

9. In a two speed remote indicating device adapted to be connected to a two speed transmitter means, the combination including a coarse control transformer and a fine control transformer, means mechanically connecting the movable elements of said transformers, said control transformers being electrically connectable to said transmitter means, servo motor generator means mechanically connected to said control transformers, and circuit means including a driver transistor, a power transistor, means connecting said driver transistor to said fine signal control transformer, means for connecting said coarse signal transformer to a connecting means between the output of said driver transistor and input of said power transistor, a non-linear voltage sensitive means between said coarse signal control transformer and the connection to said power transistor operable so that when the coarse signal voltage reaches a predetermined value, said coarse signal will drive the servo motor, means supplying stick-off voltage to said coarse control transformer, and means connecting the generator of said servo motor generator means to said transformers to inhibit hunting.

10. In a two speed remote indicating device adapted to be connected to a two speed transmitter means, the combination including a coarse control transformer means and a fine control transformer means, said transformer means having their movable elements mechanically connected, said control transformer means being electrically connectable to said transmitter means, servo motor means mechanically connected to said control transformer means for rotating the same and circuit means including a driver transistor, a power transistor, said driver transistor being connectable to the fine signal control transformer means, means for connecting the coarse signal transformer means to the output of said driver transistor and input of said power transistor, current limiting means for limiting current to said power transistor, temperature responsive means connected to said current limiting means and operable to bypass said current limiting means below a predetermined temperature, and a non-linear voltage sensitive means in the connection from said coarse signal control transformer and said power transistor operable so that when the coarse signal voltage reaches a predetermined value, the coarse signal will override the fine signal and drive the servo motor.

11. In a two speed remote indicating device adapted to be connected to a two speed transmitter means, the combination including a coarse control transformer means and a fine control transformer means, said transformer means having their movable elements mechanically connected, said control transformer means being electrically connectable to said transmitter means, servo motor generator means mechanically connected to said control transformer means for rotating the same, and circuit means including a driver transistor, a power transistor, said driver transistor being connectable to the fine signal control transformer means, means for connecting the coarse signal transformer means to the output of said driver transistor and input of said power transistor, current limiting means limiting for current to said power transistor, temperature responsive means connected to said current limiting means and operable to bypass said current limiting means below a predetermined temperature, and a non-linear voltage sensitive means in the connection from said coarse signal control transformer and said power transistor operable so that when the coarse signal voltage reaches a predetermined value, the coarse signal will override the fine signal and drive the servo motor means connecting the generator of said servo motor generator to said transformer means to inhibit hunting.

12. In a two speed remote indicating device adapted to be connected to a two speed transmitter means, the combination including a coarse control transformer means and a fine control transformer means, said transformer means having their movable elements mechanically connected, said control transformer means being electrically connectable to said transmitter means, servo motor generator means mechanically connected to said control transformer means for rotating the same and circuit means including a driver transistor, a power transistor, said driver transistor being connectable to the fine signal control transformer means, means for connecting the coarse signal transformer means to the output of said driver transistor and input of said power transistor, current limiting means for limiting current to said power transistor, temperature responsive means connected to said current limiting means and operable to bypass said current limiting means below a predetermined temperature, means supplying an auxiliary voltage to said coarse control transformer means and a non-linear voltage sensitive means in the connection from said coarse signal control transformer and said power transistor operable so that when the coarse signal voltage reaches a predetermined value, the coarse signal will override the fine signal and drive the servo motor, means connecting the generator of said servo motor to said transformer means to inhibit hunting.

References Cited in the file of this patent

UNITED STATES PATENTS

| | | |
|---|---|---|
| 2,115,086 | Riggs | Apr. 26, 1938 |
| 2,414,384 | Moseley | Jan. 14, 1947 |
| 2,446,532 | Edwards | Aug. 10, 1948 |
| 2,453,815 | Rodeman | Nov. 16, 1948 |
| 2,455,364 | Hays | Dec. 7, 1948 |
| 2,489,689 | Wald | Nov. 29, 1949 |
| 2,561,654 | Eller | July 24, 1951 |